United States Patent [19]
Cohen

[11] Patent Number: 5,163,622
[45] Date of Patent: Nov. 17, 1992

[54] DRIP IRRIGATION LINE AND METHOD OF MAKING SAME

[75] Inventor: Amir Cohen, Tuvalium, Israel

[73] Assignee: Agroteam Consultants Ltd., Migdal Ha'emek, Israel

[21] Appl. No.: 573,924

[22] Filed: Aug. 28, 1990

[30] Foreign Application Priority Data

Sep. 8, 1989 [IL] Israel ......................................... 91571

[51] Int. Cl.⁵ ............................................. B05B 15/00
[52] U.S. Cl. ...................................... 239/542; 264/172
[58] Field of Search ................. 239/542, 547; 264/172

[56] References Cited

U.S. PATENT DOCUMENTS

| | | | |
|---|---|---|---|
| 3,896,999 | 9/1974 | Barragán | 239/542 X |
| 4,541,569 | 9/1985 | Langa | 239/542 X |
| 4,702,787 | 10/1987 | Ruskin et al. | 264/259 X |
| 4,817,875 | 4/1989 | Karmeli et al. | 239/542 |
| 4,880,167 | 11/1989 | Langa et al. | 239/542 |

Primary Examiner—Andres Kashnikow
Assistant Examiner—William Grant
Attorney, Agent, or Firm—Benjamin J. Barish

[57] ABSTRACT

A drip irrigation line includes a continuous tube having a plurality of openings along spaced intervals, and a plurality of flow reducers in the form of discrete elements bonded at spaced intervals to a continuous, elongated, flexible element of higher mechanical strength than that of the flow reducer elements, enhancing the strength of the tube.

19 Claims, 4 Drawing Sheets

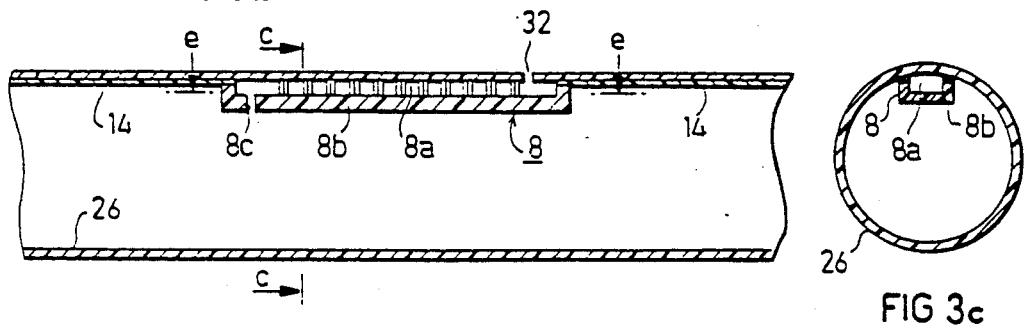
FIG 3a
FIG 3c
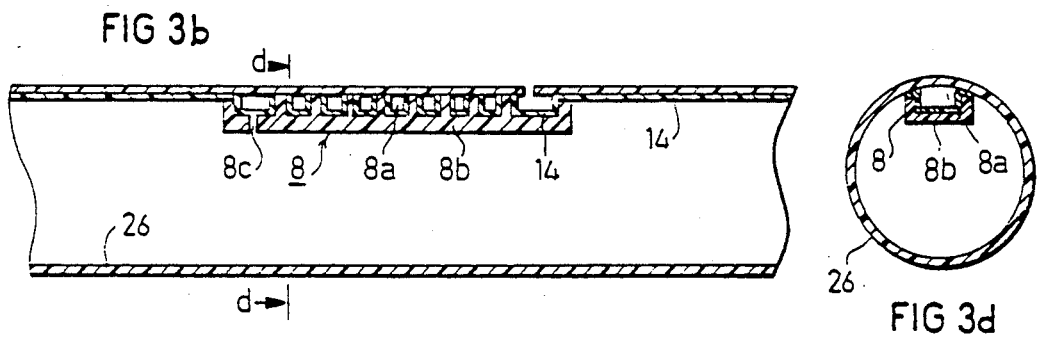
FIG 3b
FIG 3d
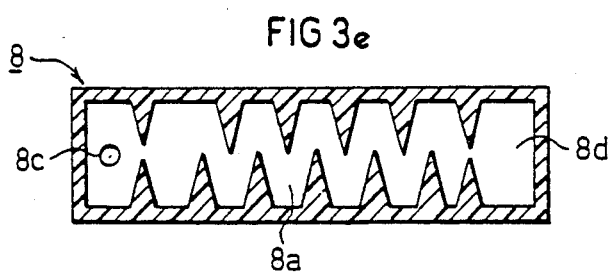
FIG 3e
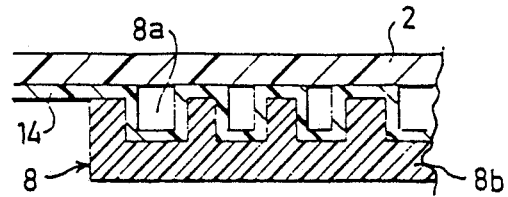
FIG 3f FIG 5
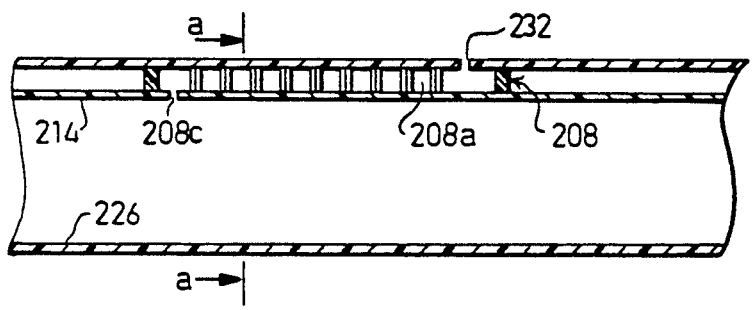
FIG 5a
FIG 6
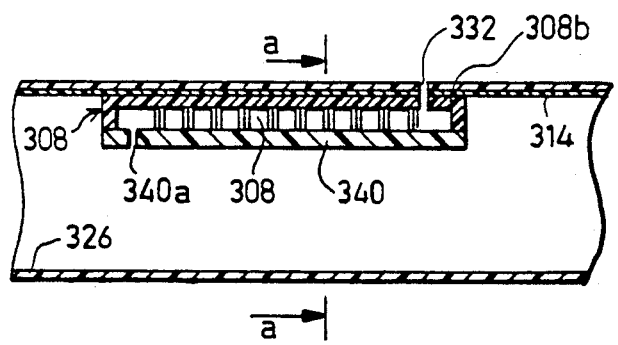
FIG 6a

DRIP IRRIGATION LINE AND METHOD OF MAKING SAME

FIELD AND BACKGROUND OF THE INVENTION

The present invention relates to a drip irrigation line, and also to a method of making such lines.

Drip irrigation lines generally include a continuous tube having a plurality of openings therethrough along spaced intervals of the tube, and a plurality of flow reducer elements bonded to one face of the tube in communication with the openings so as to reduce the flow of the irrigation water outletted from the line to drips or trickles. Such drip irrigation lines are gaining widespread use because of their many advantages, including efficiency in the delivery of the irrigating water directly to the plant roots, and substantial savings in the irrigation water required. Examples of drip irrigation lines that have been previously developed are described in U.S. Pat. Nos. 3,896,999, 4,307,841, 4,519,546, 4,702,787 and 4,728,042. U.S. Pat. No. 4,728,042 discloses a drip irrigation line wherein individual flow reducer elements or drippers are bonded at spaced intervals along the inner face of a continuous tube. U.S. Pat. No. 4,702,787 discloses a method of making drip irrigation lines wherein the flow-reducer or dripper elements are injection-molded onto a face of a flexible sheet, which sheet is subsequently used to form a seamed tube.

OBJECTS AND BRIEF SUMMARY OF THE INVENTION

An object of the present invention is to provide a novel drip irrigation line, as well as a novel method of making such lines, having advantages over the known constructions and methods, as will be described more particularly below.

According to the present invention, there is provided a drip irrigation line comprising a continuous tube having a plurality of openings therethrough along spaced intervals, and a plurality of flow reducer elements carried by one face of the tube in communication with the openings; characterized in that the flow reducer elements are discrete elements bonded at the spaced intervals to a continuous, elongated, flexible element of higher mechanical strength than that of the flow reducer elements to form a continuous composite strip, which latter strip is bonded to the inner face of the tube. As one example, the continuously elongated element may be a strip of plastic material having high strength, and as another example, it may include one or more filaments, wires or cords also having higher strength than the flow reducer elements.

According to another aspect of the invention, there is provided a method of making a drip irrigation line comprising: injection-molding a plurality of flow reducer elements on a continuous, elongated, flexible element to produce a continuous composite strip including the elongated flexible element carrying the plurality of flow reducer elements; extruding a tube while concurrently feeding and bonding the continuous composite strip to the extruded tube; and forming outlet opening through the tube.

A drip irrigation line constructed in accordance with the above features provides a number of important advantages, particularly when made according to the above-described method. One important advantage is that extruding the tube, while concurrently feeding the continuous composite strip including the elongated element and its flow-reducer elements bonded thereto, is much more easily automated and requires simplier apparatus than the method as described, for example, in the above-cited U.S. Pat. No. 4,728,042 wherein the dripper elements are individually fed to the extruder. Another important advantage is that the continuous, elongated, flexible element bonded to the extruded tube enhances the strength of the tube, and thereby permits the tube to be made of thinner material, enabling a substantial saving in the cost of the dripper line. A still further advantage is that since the flow-reducer or dripper elements are supported by the continuous, elongated, flexible element, the dripper elements need not have the rigidity that would otherwise be required when they are individually fed to the tube extruder, thereby not only enabling savings in the cost of this material, but also producing less chance of tearing or collapsing the extruded tube when rolled in the form of a reel.

Further features and advantages of the invention are described below.

BRIEF DESCRIPTION OF THE DRAWINGS

The invention is herein described, by way of example only, with reference to the accompanying drawings, wherein:

FIG. 3a and 3b are longitudinal sectional views illustrating two forms of drip irrigation line constructed in accordance with the present invention, FIGS. 3c and 3d being sectional views along lines c—c and d—d of FIGS. 3a and 3b, respectively, and FIG. 3e being a sectional view along line e—e of FIG. 3a and FIG. 3f is an enlarged fragmentary view of FIG. 3b;

FIG. 4 is a longitudinal sectional view illustrating another form of drip irrigation line constructed in accordance with the present invention, FIGS. 4a, 4b, being sectional views along lines a—a and b—b of FIG. 4, while

FIGS. 5 and 6 are longitudinal sectional views illustrating further forms of drip irrigation lines constructed in accordance with the present invention, FIGS. 5a and 6a being sectional views along lines a—a of FIGS. 5 and 6, respectively.

DESCRIPTION OF PREFERRED EMBODIMENTS

Figure 1:
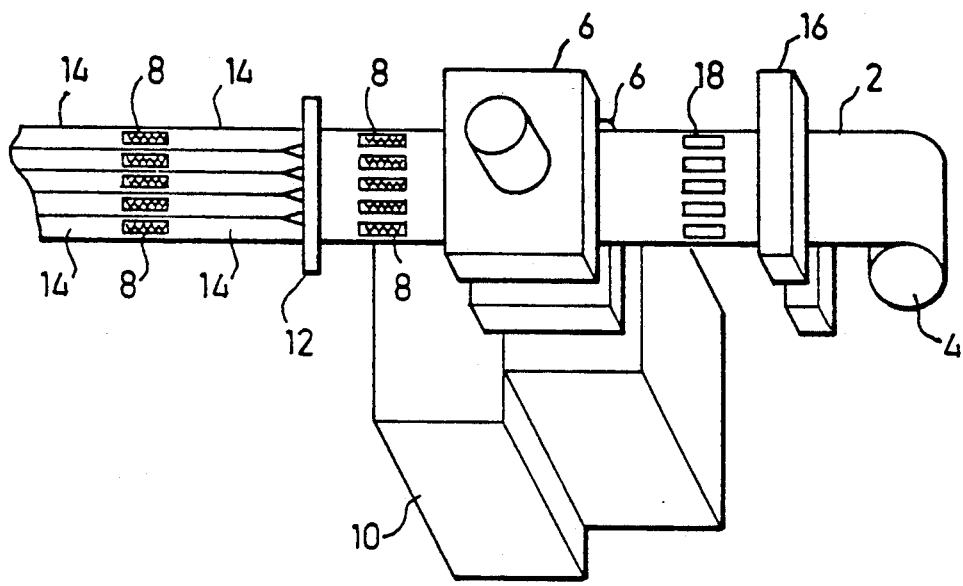
FIGS. 1 and 2 are three-dimensional views schematically illustrating the injection-molding and the extrusion apparatus, respectively, for producing drip irrigation lines in accordance with the method of the present invention.
Figure 2:
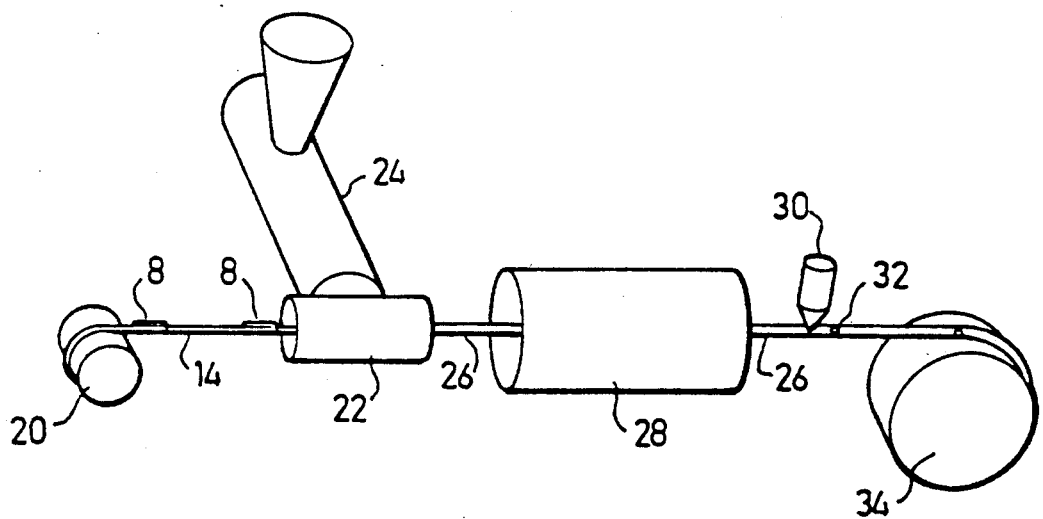

With reference first to FIGS. 1 and 2, FIG. 1 illustrates apparatus for injection molding a plurality of the flow-reducer elements on a continuous, elongated, flexible element to produce a continuous composite strip; whereas FIG. 2 illustrates the apparatus for extruding a tube while concurrently feeding the continuous composite strip including the elongated element and its flow-reducer elements and bonding the composite strip to the tube. The apparatus of FIG. 2 also forms the outlet openings through the tube after the flow-reducer elements, including their continuous, elongated flexible element, have been bonded to the extruded tube. In these examples, the continuous flexible element on which the flow-reducer elements are bonded is in the form of a strip or film of plastic material, but it will be appreciated that this continuous element may be in other forms, such as one or more filaments, wires or cords, as will be more particularly described below with respect to FIGS. 4c and 4d.

FIG. 1, illustrating the injection-molding apparatus, comprises a sheet of plastic material 2 supplied from a roll 4 and passed between molding plates 6 which injection-mold a plurality of flow-reducer elements 8 at spaced intervals along the length of the sheet. The plastic material for the molding heads 6 is supplied from an injection-molding machine 10. In the example illustrated, the molding heads 6 simultaneously apply a plurality (e.g., 5) of flow reducer elements 8 to the sheet 2. The illustrated apparatus therefore includes a slitter 12 for slitting the plastic sheet 2 into a plurality of continuous composite strips 14, each strip including a plurality of the flow-reducer elements 8 injection-molded thereon at spaced intervals along the strip.

As will be described more particularly below, the flow-reducing or dripper elements 8 are of the labyrinth type, each being formed with a flow-reducing channel open on at least one face of the respective element. In some described embodiments, each of the flow-reducing elements 8 is applied to the plastic sheet 2 with the channel-closed faces of the elements in contact with the plastic sheet; whereas in other described embodiments, the flow-reducing elements are applied with their channel-open faces facing the plastic sheet.

FIG. 1 illustrates the inclusion of a perforator 16 upstream of the molding heads 6 for producing perforations 18 having the configuration of, and for receiving, the flow-reducing elements 8 applied by the molding heads 6. Such a construction is shown in FIG. 3a and 3c, as will be described below. Perforator 16, is optional, since it would not be required, for example, in the variation illustrated in FIGS. 3a and 3c, or in those embodiments where the flow-reducer elements 8 are applied with their channel-closed face in contact with the plastic sheet 2, as described below with respect to FIGS. 4 and 5.

The continuous complete plastic strips 14, each carrying the plurality of flow-reducer elements 8 along spaced intervals as produced by the apparatus of FIG. 1, would normally be wound on a reel and then supplied to the extrusion apparatus illustrated in FIG. 2 for extruding the tube while integrating the flow-reducer elements 8 and their plastic strip 14 with the extended tube.

FIG. 2 illustrates one of the continuous composite plastic strips 14 carrying the plurality of flow-reducer elements 8 supplied from a supply reel 20 and passing through an extruder head 22 of an extrusion machine 24. FIG. 2 also illustrates the extruded tube 26 emerging from the extrusion head 22 and having integrally bonded to it the plastic strip 14 and the plurality of flow-reducer elements 8 concurrently fed to the extrusion head 22 with the extrusion material from the extruder 24.

Tube 26 is then passed through a cooling unit 28 which cools the extruded tube, and a perforator unit 30 which perforates the tube 26 with holes 32 at spaced intervals in alignment with the outlet ends of the flow-reducer elements 8 bonded to the tube, to produce the outlet openings for the irrigating water. The so-produced tube is then wound on a drum 34.

The above-described apparatus of FIGS. 1 and 2 may be used for producing various constructions of drip irrigation lines. FIGS. 3a–6a illustrate a number of such constructions for purposes of example. In these constructions, the flow-reducer elements 8 are of the labyrinth type as illustrated in FIG. 3e, including a labyrinth 8a open on one face of the element and closed on the opposite face 8b (FIGS. 1, 3a, 3c). The labyrinth 8a connects the inlet opening 8c to the outlet chamber 8d communicating with the outlet opening 32 formed through the extruded tube 26.

FIGS. 3a and 3c illustrate an example wherein the perforator 16 (FIG. 1) is used to form the rectangular perforations 18 in the plastic sheet 2 for subsequently receiving the flow-reducer elements 8 before the plastic sheet is slitted into the strips 14. In this construction, the labyrinth channels 8a of the flow-reducer elements 8 are applied to the plastic sheet 2 with the channel-open face of the elements facing the plastic sheet 2 and with the channel-closed face, shown at 8b in FIG. 3a, away from the plastic sheet. Thus, the outlet chamber 8d at the outlet end of the labyrinth 8a will communicate directly with the outlet opening 32 formed through the tube 26. The inlet end of the labyrinth 8a is produced by inlet opening 8c formed through the channel-closed face 8b of the flow-reducer element 8 at the time that element is injection-molded onto sheet 2.

It will thus be seen that in the arrangement illustrated in FIGS. 3a and 3c, the open face of the labyrinth 8a is closed by the inner face of the extruded tube, so that the irrigated water enters inlet opening 8c of the flow-reducer element 8, travels through the labyrinth 8a, and then exists at a lower rate through outlet opening 32.

FIGS. 3b and 3d illustrate a variation wherein the plastic sheet 2, subsequently slit into strips 14, is not perforated with the rectangular openings 18 (FIG. 1), but rather is embossed with rectangular cavities to receive the flow-reducer elements 18, and the latter elements are applied with their channel-closed faces 8b bonded to the plastic sheet 2 subsequently slitted into the strips 14.

Figure 4:
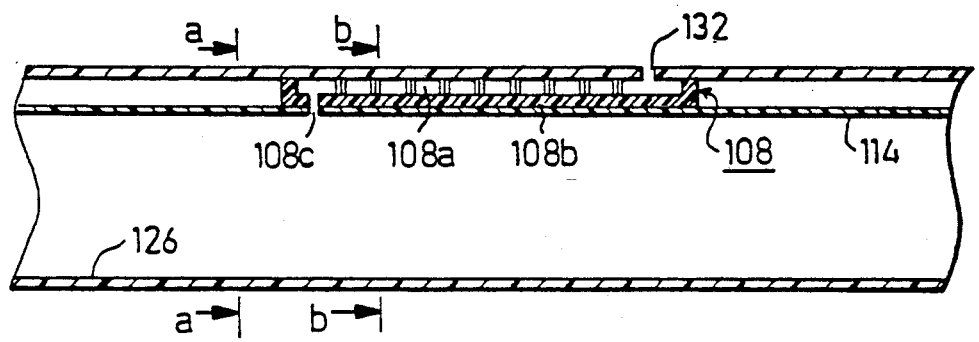

FIG. 4 illustrates a construction wherein the flow-reducer element, generally designated 108, is applied with the closed face 108b of the labyrinth 108a in contact with the plastic sheet 2 (FIG. 1) subsequently slitted into the strips, and shown at 114 in FIG. 4. In this case, the inlet opening 108c into each labyrinth 108a is formed simultaneously with the injection-molding of the flow-reducer element 108 onto the plastic sheet, to enable the water to enter the labyrinth 108a and to exit from the outlet opening 132 in the extruded tube 126.

Figure 4A:
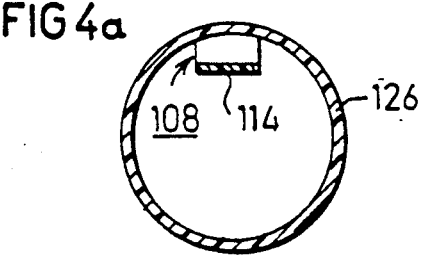
Figure 4B:
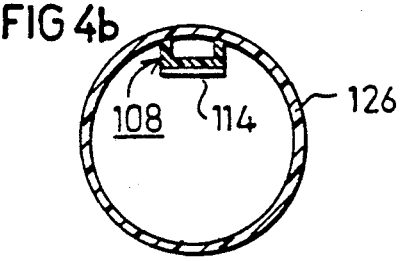

FIGS. 4a and 4b, sectional views along lines a—a and b—b of FIG. 4, more particularly illustrate the continuous, elongated, flexible element, on which the flow-reducer elements 108 are injection molded, as being in the form of a strip of plastic material, as shown on 114.

Figure 4C:
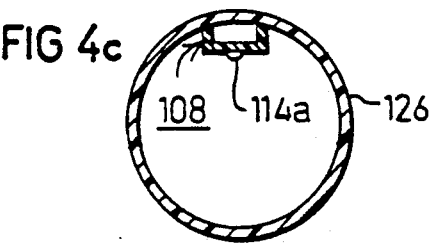
FIGS. 4c and 4d are views corresponding to FIG. 4b but illustrating variations in the structure of the drip irrigation line.
Figure 4D:
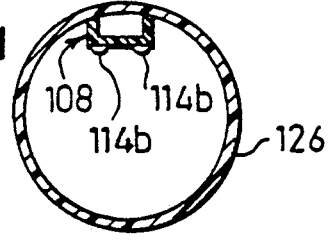

FIG. 4c illustrates the variation wherein this elongated flexible element is in the form of a filament, wire or cord, as shown as 114a, whereas FIG. 4d illustrates the variation wherein there are two such filaments, wires or cords as shown at 114b. In both cases, the flow-reducer elements 108 are applied with their channel-closed faces 108b in contact with the continuous elongated element 114a (FIG. 4c) or 114b (FIG. 4d), so that the channel-open faces of the labyrinth are closed by the inner face of the extruded tube 126.

FIG. 5 illustrates another type of drip irrigation line which may be constructed using the apparatus of FIGS.

1 and 2. In this case, the flow-reducer elements 208 are formed with flow-reducing channels 208a which are open on both faces of the respective element. Thus, when the flow-reducing elements 208 are applied to the plastic sheet (2) subsequently slitted into the strips 214, the plastic strip closes one of the open faces of the labyrinth, and when the flow-reducing elements carried by the continuous plastic strip 214 are applied to the extruded tube 226, the inner face of the extruded tube closes the opposite open face of the labyrinth. It will thus be seen that in this construction the plastic strip 214 acts as a membrane which is subject to the pressure of the water within tube 226 and therefore deflects into the spaces between the channels defining the labyrinth 208a. The plastic strip 214 therefore regulates the flow of the water as it passes through the labyrinth 208a from the inlet 208c, before it exits from the outlet 232, in accordance with the pressure of the water within the tube.

FIG. 6 illustrates a still further construction of drip irrigation line which may be produced by the apparatus of FIGS. 1 and 2. This construction is similar to that described above with respect to FIGS. 3a and 3b, except that the flow-reducing elements 308 are applied with their channel-closed faces 308b facing the plastic strip 314 formed from the plastic sheet (2) on which the flow-reducer elements are injection molded. In this case, the flow-reducer elements 308 are injection-molded with an additional layer 340 which closes the open-faces of the labyrinth. The additional layer 340 closing the open faces of the labyrinth is formed with an inlet opening 340a at one end of the labyrinth, and the channel-closed face 308b of the flow reducer elements is formed with an outlet opening at the other end of the labyrinth in alignment with the outlet opening 332 in the tube. Since the labyrinth is closed on one side by the additional layer 340, and on the other side by the plastic strip 314 and the inner face of the extruded tube 326, this arrangement more positively assures that the water inletted through the inlet 340a will traverse the complete labyrinth 308a before exiting through the outlet opening 332.

In all the above-described arrangements, the continuous elongated element, such as the plastic strips 14, 114, 214 and 314, as well as the one or more filaments (114a, FIG. 4c or 114b, FIG. 4d), are preferably made of a plastic material which has a higher mechanical strength than the flow-reducing elements. For purposes of example, the flow-reducing elements, and also the extruded tube (e.g., 26), may be made of low-density polyethlene, whereas the continuous elongated elements of higher mechanical strength may be made of high-density polyethlene, or other known materials having relatively high strength compared to the strength of the flow-reducer elements and the extruded tube.

It will be seen that the above-described constructions provide a number of important advantages. Thus, the high-strength continuous elongated element, which is bonded to and integrated with the extruded tube, increases the overall strength of the tube and therefore enables the required mechanical strength of the tube to be obtained with thinner tube walls, providing substantial savings not only in initial material costs, but also in subsequent handling costs. Further, the provision of the continuous, elongated, flexible elements, particularly when such elements are in the form of strips of plastic material as described above, enables the flow-reducer elements (e.g., 8) to be less rigid (i.e., more flexible) than would otherwise be required when these flow-reducer elements are fed individually into the tube-extruder. This advantage is particularly important in that by making the flow-reducer elements more flexible, there is less tendency that they may tear or pinch-closed the extruded tube when wound on the storage reel or when applied in the field. A still further important advantage is that feeding the flow-reducer element to the extruder (FIG. 2) in the form of a continuous strip facilitates the overall automation of the extrusion operation as compared to the previous processes wherein the flow-reducer elements are fed individually to the extruder.

While the invention has been described with respect to several preferred embodiments, it will be appreciated that these are set forth purely for purposes of example, and that many other variations, modifications and applications of the invention may be made.

What is claimed is:

1. A drip irrigation line, comprising a continuous tube having a plurality of openings therethrough along spaced intervals thereof, and a plurality of flow reducer elements carried by one face of the tube in communication with said openings; characterized in that said flow reducer elements are discrete elements bonded at said spaced intervals to a continuous, elongated, flexible element of higher mechanical strength than that of said flow reducer elements to form a continuous composite strip, which latter strip is bonded to the inner face of said tube.

2. The drip irrigation line according to claim 1, wherein said continuous elongated element is a strip of plastic material.

3. The drip irrigation line according to claim 1, wherein each of said flow reducer elements is formed with a flow-reducing labyrinth channel open on at least one face of the respective element.

4. The drip irrigation line according to claim 3, wherein the channels of said flow reducer elements are open on one face and are closed on the opposite face, said flow reducer elements being bonded at their channel-open faces to the continuous elongated element.

5. The drip irrigation line according to claim 3, wherein the channels of said flow reducer elements are open on one face and are closed on their opposite faces, the flow reducer elements being bonded at their channel-closed faces to the continuous elongated element, and at their channel-open faces to the tube such that the continuous composite strip is bonded to the inner face of said tube by said flow reducer elements.

6. The drip irrigation line according to claim 3, wherein the channels of said flow reducer elements are open on both faces, the flow reducer elements being bonded at one channel-open face to the continuous elongated element, and at their opposite channel-open face to the tube.

7. The drip irrigation line according to claim 3, wherein the channels of said flow reducer elements are open on one face and are closed on the opposite face, the closed face of the channels being bonded to said continuous elongated element, which element is in turn bonded to the inner face of said tube; the open face of the channels being closed by an additional plastic layer bonded to the flow reducer elements.

8. The drip irrigation line according to claim 1, wherein said continuous elongated element includes at least one filament.

9. The drip irrigation line according to claim 1, wherein said flow reducer elements are of injection-molded plastic material, and said tube is an extruded plastic tube.

10. A method of making a drip irrigation line, comprising: injection-molding a plurality of flow reducer elements on a continuous, elongated, flexible element to produce a continuous composite strip including said elongated flexible element carrying said plurality of said flow reducer elements; extruding a tube while concurrently feeding and bonding said continuous composite strip to the extruded tube; and forming outlet openings through said tube.

11. The method according to claim 10, wherein said continuous, elongated, flexible element is of higher mechanical strength than that of said flow reducer elements.

12. The method according to claim 11, wherein said continuous composite strip is bonded to the inner face of said tube.

13. The method according to claim 12, wherein said continuous elongated element is a strip of plastic material.

14. The method according to claim 13, wherein said flow reducer elements are of the labyrinth type, each being formed with a flow-reducing channel open on at least one face of the respective element.

15. The method according to claim 14, wherein the channels of said flow reduce elements are open on one face and are closed on the opposite face, said flow reducer elements being bonded at their channel-open faces to the continuous elongated element.

16. The method according to claim 14, wherein the channels of said flow reducer elements are open on one face and are closed on their opposite faces, the flow reducer elements being bonded at their channel-closed faces to the continuous elongated element, and at their channel-open faces to the tube.

17. The method according to claim 14, wherein the channels of said flow reducer elements are open on both faces, the flow reducer elements being bonded at one channel-open face to the continuous elongated element, and at their opposite channel-open face to the tube.

18. The method according to claim 14, wherein the channels of said flow reducer elements are open on one face and are closed on the opposite face, the closed face of the channels being bonded to said continuous elongated element, which element is in turn bonded to the inner face of said tube; the open face of the channels being closed by an additional plastic layer bonded to the flow reducer elements.

19. The method according to claim 12, wherein said continuous elongated element includes at least one filament.

* * * * *